United States Patent

Van Der Colf et al.

[11] Patent Number: 5,997,606
[45] Date of Patent: Dec. 7, 1999

[54] PRODUCTION OF TITANIUM SLAG

[75] Inventors: Jacobus Cornelius Gideon Kotze Van Der Colf, Krugersdorp; Johannes Nell, Randburg; Frances Stander, Roodepoort, all of South Africa

[73] Assignee: Billiton SA Limited, Johannesburg, South Africa

[21] Appl. No.: 09/129,839

[22] Filed: Aug. 6, 1998

[51] Int. Cl.[6] .................................................. C22B 9/00
[52] U.S. Cl. .............................. 75/393; 75/613; 75/435; 75/503; 75/10.35; 75/10.49; 423/83
[58] Field of Search .......................... 75/393, 613, 435, 75/503, 10.35, 10.49; 423/83

[56] References Cited

U.S. PATENT DOCUMENTS

| 3,829,309 | 8/1974 | Gomes et al. | 75/435 |
| 5,578,109 | 11/1996 | Harris et al. | 75/399 |
| 5,730,774 | 3/1998 | Hollitt et al. | 75/419 |
| 5,853,452 | 12/1998 | Warner | 75/435 |
| 5,900,040 | 5/1999 | Harris et al. | 75/435 |

*Primary Examiner*—Ngoclan Mai
*Attorney, Agent, or Firm*—Nikaido Marmelstein Murray & Oram LLP

[57] ABSTRACT

A process for producing titanium slag which is low in radioactivity wherein molten titanium slag, produced by smelting ilmenite in the presence of a reductant in a DC electric arc furnace, is separated from molten iron, boron in an amount which is less than 2.5% equivalent $B_2O_3$ of the slag is blended with the molten slag which thereafter is allowed to cool to form a glassy phase which contains the bulk of the radioactive elements of the slag before being crushed to particles below about 1 mm, whereafter the radioactive elements are leached to leave a titanium slag product which is low in radioactivity.

13 Claims, 1 Drawing Sheet

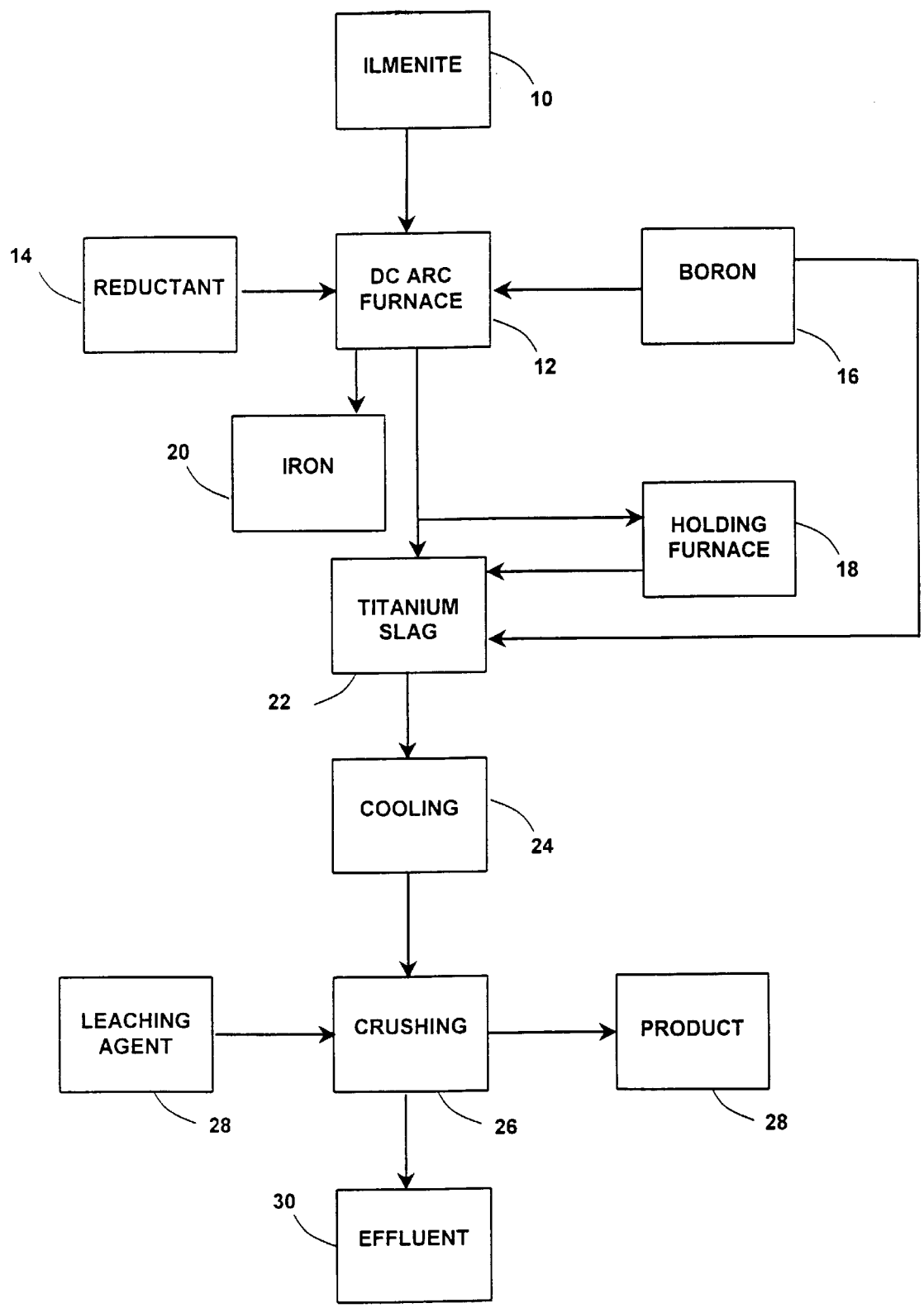

PRODUCTION OF TITANIUM SLAG

BACKGROUND OF THE INVENTION

This invention relates generally to the production of titanium slag from ilmenite and is more particularly concerned with reducing the radioactive content in the slag product.

The removal of radionuclides from titanium bearing materials is of importance in the manufacture of feedstock for the titanium pigment industry. Titanium oxide pigments are produced from various titanium bearing materials such as rutile, ilmenite, titanium slag and synthetic rutile. The presence of radionuclides is common but is not acceptable to the pigment manufacturers because the radionuclides accumulate in the residue of manufacture and constitute a difficult disposal problem.

Various processes are used for upgrading titanium bearing pigment feedstock. These usually are based on the use of some means for removal of impurities such as iron, manganese, alkali elements and other minor elements. Some of these processes are effective in the removal of radionuclides even though the processes are not specifically designed for radionuclide removal. On the other hand in cases where the titanium bearing material is already substantially free of impurities the cost of these processes is an unnecessary expense. There is a need for a process which will not add substantial cost to the existing processes for converting titanium bearing materials to pigment feedstock.

Common processes involve the conversion of ilmenite to synthetic rutile and the conversion of ilmenite to titanium slag. These processes remove mainly iron but also small amounts of other elements. These processes do not however have the effect of removing radionuclides unless certain additional effort is applied for this purpose.

By way of example the specifications of South African patents Nos. 93/5922 and 93/5474 describe processes to upgrade titaniferous materials by removing impurities. These processes are designed to be compatible with the production of synthetic rutile and involve the removal of radionuclides. The processes can be applied to titanium bearing materials such as ilmenite or to the product of any process used to produce synthetic rutile, and can also be used as a replacement for some of the steps in the production of synthetic rutile.

The aforementioned processes provide for the addition of compounds which form a glassy phase during a heat treatment step. Impurities, particularly radioactive elements, migrate to the glassy phase. Subsequent leaching steps are effective in dissolving the radioactive elements out of the glassy phase. A typical additive to enhance the solubility of the glassy phase is borax but other components containing boron and oxygen may also be used. The heat treatment process together with the addition of borax can be conducted on ilmenite before conversion to synthetic rutile or titanium slag.

Under some conditions it is attractive to convert ilmenite to titanium slag. This has been done in some installations which make use of electric furnaces where coal or another reductant is used to convert ilmenite by reduction into iron metal and titanium slag. DC arc furnaces have also been used in this process. Any radioactivity present in the ilmenite will appear in the slag after reduction in the electric furnace.

The specification of South African patent No. 95/3046 teaches that borax can be added to titanium slag before roasting the mixture at about 1000° C. The cooled slag is leached with alkali and acid and the silica content of the slag is reduced. A reduction in radioactivity is not mentioned but it is expected that this would occur because similar processes applied to other titanium bearing materials are effective.

If however this technique is used for radioactivity removal an additional roasting and leaching step must be applied either to the ilmenite before slag production or to the slag after its production.

If it is desired to produce titanium slag then it is preferable to produce a slag product which is low in radioactivity without the additional roasting process.

The specification of U.S. Pat. No. 3,829,309 teaches that smelting of ilmenite to produce a borate-titanate slag can be conducted at 1200° C., which is a much lower temperature than that used in an alternative known process of smelting ilmenite without fluxing. This process has been carried out in a rectangular AC furnace with six electrodes in line, although a DC arc furnace can be used in place of the AC furnace. The smelting action takes place at 1700° C. and molten pig iron and titanium slag are tapped into ladles.

The aforementioned American patent discloses that the slag produced is leached with water to remove borate and the resulting slag is also leached with water to produce a feedstock to the pigment industry.

The process, which uses borax as a flux, has the following disadvantages:

(a) the slag is not of a very high grade—typically 70% to 80% $TiO_2$. If the grade must be higher then the recovery rate of titanium from the slag phase is low.

(b) the cost of the process is high. Firstly losses of borate are high and secondly, as taught by the patent, air blowing of the slag is necessary to oxidise the titanium.

SUMMARY OF THE INVENTION

The invention provides a process for producing titanium slag which includes the steps of:

(a) smelting ilmenite in an electric arc furnace in the presence of a reductant to produce a slag, (b) adding a boron compound in an amount of from 0.5% to 2.5% equivalent $B_2O_3$ to the slag, (c) cooling titanium slag which is tapped from the furnace, (d) crushing the cooled slag, and (e) leaching the crushed slag to dissolve radioactive elements in the slag into the leaching material.

The electric arc furnace is preferably a DC arc furnace.

Smelting of the ilmenite may take place at a temperature of from 1650° C. to 1750° C., and preferably at a temperature of about 1700° C.

The reductant may be in any suitable form and preferably is carbon which is provided as coal, charcoal or coke.

The boron compound may be in the form of anhydrous sodium borate or any other suitable compound of boron and oxygen.

The boron may be added:

(I) prior to step (a) by adding the boron compound to the ilmenite; or (ii) during step (a) by introducing the boron compound into the furnace; or (iii) after step (a) by adding the boron compound to titanium slag while the slag is molten.

Preferably step (iii) is used. Molten metal and molten titanium slag may be tapped from the furnace and the slag may be kept molten e.g. in a holding furnace. The boron compound is then added to the molten titanium slag in the holding furnace.

Alternatively the holding furnace is not used and the boron compound is added directly to the slag, e.g. during tapping thereof.

The boron compound may be mixed with the molten slag over a sufficient time to ensure that the boron compound is adequately blended with the slag before the slag solidifies.

The cooled slag may be crushed to a suitable size and preferably is crushed to a size below about 1 mm.

Leaching may be effected using any suitable leaching medium. An appropriate leaching agent is about 3% hydrochloric acid.

BRIEF DESCRIPTION OF THE DRAWING

The invention is further described by way of example with reference to the accompanying drawing which is a block diagram of a process according to the invention for producing titanium slag and reducing the radioactive content in the slag product.

DESCRIPTION OF PREFERRED EMBODIMENT

The accompanying drawing illustrates a process according to the invention wherein ilmenite 10 is smelted at a temperature of about 1700° C. in a DC arc electric furnace 12 in the presence of a reductant 14 which, in this example, is carbon which is introduced into the furnace 12 in the form of coal, charcoal or coke.

A boron compound 16 is introduced into the furnace 12. Although the boron can be added before melting of the ilmenite takes place it preferably is added to the molten slag in the furnace. The boron compound is added in an amount of from 0.5% to 2.5% equivalent $B_2O_3$ to the slag.

Some boron may be likely to enter the iron metal phase. This difficulty can be countered by adding the boron compound to the molten slag out of contact with the metal 20, after tapping the slag 22 from the furnace. Sufficient mixing and time are allowed for the boron to be adequately blended with the slag before the slag solidifies. The slag may be kept molten in an optional holding furnace 18 and thereafter the mixture is returned to the main material flow line. It may however be sufficient to mix the boron into the slag in a ladle without making use of a separate holding furnace.

The blended titanium slag is allowed to cool in a step 24.

After cooling the titanium slag is crushed in a step 26 to particles below about 1 mm. A leaching medium 28 is applied to the particles. A suitable leaching agent is about 3% hydrochloric acid which dissolves the radioactive elements in the particles. The effluent 30, containing radioactive elements in solution, is separated from the particles leaving a titanium slag product 32 which is low in radioactivity.

When the titanium slag is solidified in the cooling step 24 a glassy phase is formed and the radioactive elements report predominantly in the glassy phase. This phase is susceptible to the leaching step in the manner described.

The process of the invention thus relies on the addition of compounds containing boron and oxygen, in a suitable form, to the ilmenite in the furnace before melting but preferably during smelting or immediately thereafter, to form a glassy phase to which radioactive elements migrate.

The process of the invention uses a much smaller amount of borax or boron compound than the process described in the specification of U.S. Pat. No. 3,829,309. The amount is such that the conditions of conventional slag production are not changed to any significant degree i.e. the temperature at which the furnace operates is 1700° C. and the product is the same as the slag produced without borate addition.

The quantity of borate which is used is insufficient to react with substantially all of the titanium oxides contained in the ilmenite as is the case in the process of U.S. Pat. No. 3,829,309. Only 0.5% to 2.5% borate, expressed as $B_2O_3$, is added to the smelting operation and this is leached away from the product slag.

A greater quantity of $TiO_2$, at a higher grade, is recovered in the process of the invention, compared to the process described in the specification of U.S. Pat. No. 3,829,309 for the quantity of the waste component is reduced.

We claim:

1. A process for producing titanium slag which includes the steps of:

(a) smelting ilmenite in an electric arc furnace in the presence of a reductant to produce a slag, (b) adding a boron compound in an amount of from 0.5% to 2.5% equivalent $B_2O_3$ to the slag, (c) cooling titanium slag which is tapped from the furnace, (d) crushing the cooled slag, and (e) leaching the crushed slag to dissolve radioactive elements in the slag into the leaching material.

2. A process according to claim 1 wherein the electric arc furnace is a DC arc furnace.

3. A process according to claim 1 wherein smelting of the ilmenite takes place at a temperature of from 1650° C. to 1750° C.

4. A process according to claim 3 wherein the smelting takes place at a temperature of about 1700° C.

5. A process according to claim 1 wherein the reductant is carbon.

6. A process according to claim 1 wherein the boron compound is selected from anhydrous sodium borate or any other suitable compound of boron and oxygen.

7. A process according to claim 1 wherein the addition of the boron compound is effected using a step selected from:

(i) prior to step (a) by adding the boron compound to the ilmenite; or (ii) during step (a) by introducing the boron compound into the furnace; or (iii) after step (a) by adding the boron compound to titanium slag while the slag is molten.

8. A process according to claim 7 wherein molten metal and molten titanium slag are tapped from the furnace, the slag is kept molten, and the boron compound is added to the molten titanium slag.

9. A process according to claim 1 which includes the step of mixing the boron compound with the molten slag over a sufficient time to ensure that the boron compound is blended with the slag before the slag solidifies.

10. A process according to claim 1 wherein the cooled slag is crushed to a size below about 1 mm.

11. A process according to claim 1 wherein the leaching step is effected using a leaching agent which contains about 3% hydrochloric acid.

12. A process for producing titanium slag which includes the steps of (a) smelting ilmenite in a DC electric arc furnace in the presence of a carbonaceous reductant to produce a slag, (b) separating molten iron from the molten titanium slag in the furnace, (c) adding a boron compound in an amount of from 0.5% to 2.5% equivalent $B_2O_3$ to the molten titanium slag, (d) blending the boron component with the slag before the slag solidifies, (e) cooling the blended titanium slag to form a glassy phase in which the bulk of the radioactive elements in the slag report, (f) crushing the cooled slag to particles below about 1 mm, (g) applying a leaching medium to the particles to dissolve the radioactive elements in the particles, and (h) separating effluent, containing radioactive elements in solution, from the particles to obtain a titanium slag product which is low in radioactivity.

13. A process for producing titanium slag which is low in radioactivity wherein molten titanium slag, produced by smelting ilmenite in the presence of a reductant in a DC electric arc furnace, is separated from molten iron, boron in an amount which is less than 2.5% equivalent $B_2O_3$ of the slag is blended with the molten slag which thereafter is allowed to cool to form a glassy phase which contains the bulk of the radioactive elements of the slag before being crushed to particles below about 1 mm, whereafter the radioactive elements are leached to leave a titanium slag product which is low in radioactivity.

* * * * *

UNITED STATES PATENT AND TRADEMARK OFFICE
CERTIFICATE OF CORRECTION

PATENT NO : 5,997,606

DATED : December 7, 1999

INVENTOR(S) : VAN DER COLF et al.

It is certified that error appears in the above-identified patent and that said Letters Patent is hereby corrected as shown below:

After "[22] Filed: Aug. 6, 1998" insert
-- [30] Foreign Application Priority Data
Aug. 11, 1997 [SA] South Africa.......97/7134 --

Signed and Sealed this

First Day of May, 2001

Attest:

NICHOLAS P. GODICI

Attesting Officer     *Acting Director of the United States Patent and Trademark Office*